(No Model.)
P. F. MOREY.
PRESSURE REGULATING VALVE.
No. 346,212. Patented July 27, 1886.
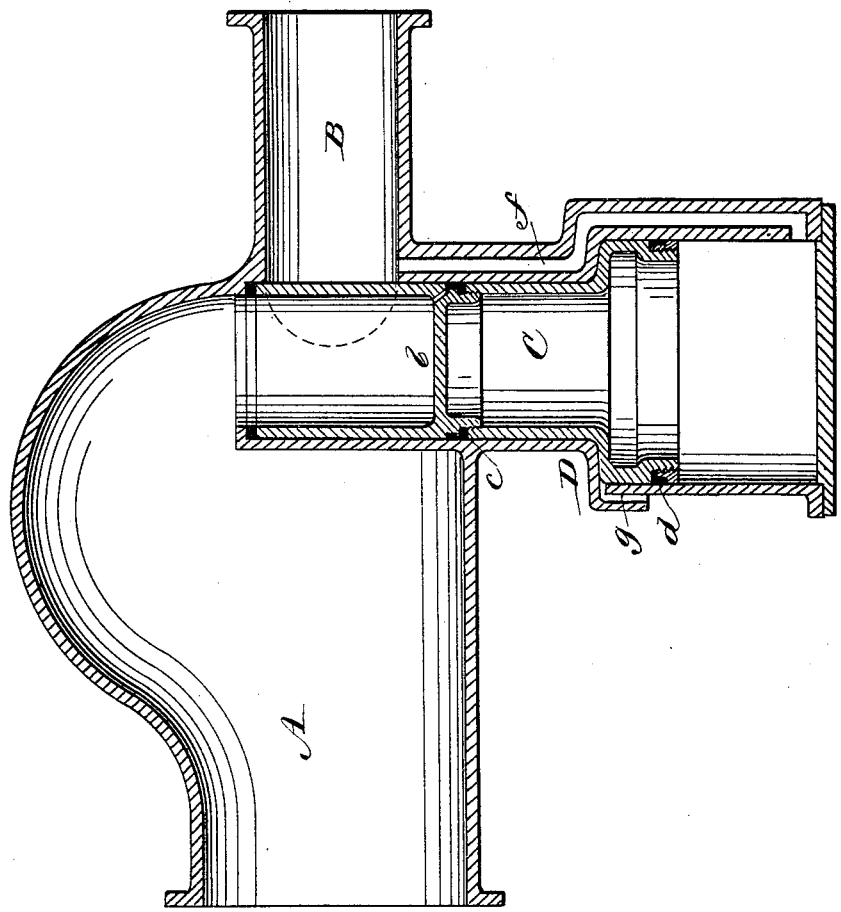
WITNESSES:
C. Neveux
C. Sedgwick
INVENTOR:
P. F. Morey
BY Munn & Co
ATTORNEYS.

UNITED STATES PATENT OFFICE.

PARKER F. MOREY, OF PORTLAND, OREGON.

PRESSURE-REGULATING VALVE.

SPECIFICATION forming part of Letters Patent No. 346,212, dated July 27, 1886.

Application filed April 14, 1886. Serial No. 198,803. (No model.)

*To all whom it may concern:*

Be it known that I, PARKER F. MOREY, of Portland, in the county of Multnomah, State of Oregon, have invented a new and useful Improvement in Pressure-Regulating Valves for Water, &c., of which the following is a full, clear, and exact description.

My invention consists in the construction and arrangement of parts, as will be hereinafter fully described and claimed.

To explain the use of the invention for the purpose to which it is here shown applied it may be observed that for ordinary water-service in cities the pressure is a great deal less than it would be if the supply were intended for fire-extinguishing purposes, and there are instances where it would be requisite either to employ both high and low service systems, or else to use pipes greatly in excess of the required strength or weight and cost necessary for a low-pressure service. Now, while it might be necessary to have the principal mains carry a high pressure, it is evident that it would be desirable to employ pipes of lesser strength or weight for the usual distribution of water for house use, in which the pressure is not required to be so great, and this my invention accomplishes.

Reference is to be had to the accompanying drawing, forming a part of this specification, in which the drawing represents a longitudinal section of my automatic pressure-regulating valve applied to a main or main-connection and distributing-pipe.

A indicates the main of a water-service system, or branch therefrom, virtually forming a part of the main, and in which it may be necessary to maintain a high pressure for fire-extinguishing purposes.

B is an ordinary service-pipe, connected with the main or leading supply-pipe A, but in which it is required to carry or distribute a lower pressure of water.

C is a differential piston-like valve, arranged to work within a valve box or case, D, at the junction of the pipes A and B, and so that when occupying its innermost position its side closes communication between the pipes A and B, as shown in the drawing, but when moved outward from over the inner end of the pipe B freely admits of water passing from A into B. This differential valve, by which is meant a valve presenting different areas on its opposite sides or ends, is here shown as of tubular construction, of different diameters in its length, with a diaphragm, *b*, intercepting its lesser diameter to divide the smaller end of the valve, which is directly exposed to the pressure of water in the main A from its outer and larger end within the valve-case D. The valve, however, is not restricted to this special construction; but it is essential that it should have a smaller inner end or head surface than its opposite or outer end. To form a close piston-like division between its smaller and larger ends, said valve, which is shown for convenience' sake as constructed of two lengths or sections, is fitted with a packing, *c*, where it works within the smaller portion of the valve-case, and may have a packing, *d*, on its enlarged portion, where it works within the larger portion of the valve-case. A duct, *f*, connects the pipe B with the outer end portion of the valve-case D.

Supposing the pressure in the main or main-connection A to be one hundred and twenty pounds, and only forty pounds pressure is required in the ordinary service or distributing pipe B, then the exposed area of the inner end of the differential valve C should be only one-third of that of the outer end of the valve. Now, if water be admitted into the main it will first act upon the smaller end of the valve C to force it outward and open the communication between the pipes A and B, and will continue to flow into B and along the duct *f* into the space back of the larger end of the valve until the pressures due to the different areas of the two ends of the valves establish an equilibrium, after which any increasing pressure in the pipe B and duct *f* will cause the valve to work inward or close, leaving, by reason of the difference in area of the two ends of the valve, the water in the pipe B at one-third the pressure, or thereabout, of that of the water in the main. Any after-draft upon the pipe B will immediately cause the pressure in the main to again open or move outward the valve until the equilibrium is again established, and the valve, as before, is again worked inward, and so on indefinitely, to maintain the necessary difference of pressure in the pipes A and B.

Any other difference of pressure in the two pipes A and B may be obtained by making the valve of suitable different areas at its opposite ends for the purpose.

To prevent any small leak impairing the efficiency of the valve by water collecting around it, a small discharge-duct or "bleeder," $g$, may be applied to the valve-case D, if desired.

Having thus fully described my invention, what I claim as new, and desire to secure by Letters Patent, is—

The combination, with the large pipe A, the smaller pipe, B, and the laterally-extending box D, having a passage, $f$, leading from its outer enlarged end into the pipe B, of the tubular valve $c$, having the interior diaphragm, $b$, between its ends, presenting surfaces of different areas, as described, the outer end of the tubular valve being enlarged to fit the enlarged part of the box D, and the inner end at times closing the pipe B, substantially as set forth.

PARKER F. MOREY.

Witnesses:
JOHN A. LESOURD,
J. P. MARSHALL.